United States Patent
Boeck et al.

(10) Patent No.: US 7,065,946 B2
(45) Date of Patent: Jun. 27, 2006

(54) LAWNMOWER HAVING MULCHING CUTTER DECK ASSEMBLY

(75) Inventors: Kevin A. Boeck, Van Dyne, WI (US); David J. Sugden, Horicon, WI (US); Todd R. Wanie, Mayville, WI (US)

(73) Assignee: Scag Power Equipment, Inc., Mayville, WI (US)

( * ) Notice: Subject to any disclaimer, the term of this patent is extended or adjusted under 35 U.S.C. 154(b) by 0 days.

(21) Appl. No.: 10/986,643

(22) Filed: Nov. 12, 2004

(65) Prior Publication Data

US 2005/0126152 A1  Jun. 16, 2005

Related U.S. Application Data

(60) Provisional application No. 60/519,491, filed on Nov. 13, 2003.

(51) Int. Cl.
*A01D 67/00* (2006.01)

(52) U.S. Cl. ............................................ 56/320.1

(58) Field of Classification Search ............... 56/320.2, 56/255, 295, 13.5, 13.6, 320.1, 17.5, 16.9, 56/DIG. 9
See application file for complete search history.

(56) References Cited

U.S. PATENT DOCUMENTS

| | | | |
|---|---|---|---|
| 2,642,711 A * | 6/1953 | Smith et al. | 56/255 |
| 2,685,774 A | 8/1954 | Willaims | |
| 2,734,327 A | 2/1956 | Whitney | |
| 2,815,634 A | 12/1957 | Bush | |
| 2,816,410 A | 12/1957 | Nobles | |
| 2,836,024 A | 5/1958 | Davis et al. | |
| 2,991,719 A | 7/1961 | Holmes | |
| 3,049,855 A * | 8/1962 | McMillan | 56/295 |
| 3,234,719 A | 2/1966 | Rank | |
| 3,245,209 A | 4/1966 | Mareck | |
| 3,339,353 A | 9/1967 | Schreyer | |
| 3,385,043 A * | 5/1968 | Seymore | 56/503 |
| 3,469,376 A | 9/1969 | Bacon | |
| 3,483,684 A | 12/1969 | Price | |
| 3,508,385 A | 4/1970 | Carlson | |
| 3,543,490 A | 12/1970 | Erickson | |
| 4,083,166 A | 4/1978 | Haas | |
| 4,099,366 A | 7/1978 | Peterson | |
| 4,121,405 A * | 10/1978 | Wolf | 56/12.9 |

(Continued)

FOREIGN PATENT DOCUMENTS

DE  2951257  7/1980

(Continued)

OTHER PUBLICATIONS

Excel Industries, Inc., Hustler, *Solve Your Problems*, undated brochure, 6 pages, no date.

(Continued)

*Primary Examiner*—Árpád Fábián Kovács
(74) *Attorney, Agent, or Firm*—Boyle Fredrickson Newholm Stein & Gratz S.C.

(57) ABSTRACT

A mulching assembly for a mower deck that has one or more cutting chambers includes a channeling plate in each cutting chamber. The channeling plate is configured to optimize air and clipping flow through the cutting chamber for mulching and dispersal of the clippings without disrupting airflow and consequently creating obstructions in the high-pressure outer region of the cutting chamber. Each channeling plate is spaced from the outer perimeter of the cutting chamber, extends in a generally non-radial direction generally parallel to the bottom surface of the cutter deck, and is mounted to the deck directly above the cutting blade in each cutting chamber.

24 Claims, 5 Drawing Sheets

U.S. PATENT DOCUMENTS

| | | |
|---|---|---|
| 4,129,977 A | 12/1978 | Comer |
| 4,149,358 A | 4/1979 | Comer |
| 4,189,903 A | 2/1980 | Jackson et al. |
| 4,189,904 A | 2/1980 | Paker |
| 4,205,512 A | 6/1980 | Thorud |
| 4,213,289 A * | 7/1980 | Kamppinen .................. 56/295 |
| 4,226,074 A | 10/1980 | Mullet et al. |
| 4,245,455 A * | 1/1981 | Martin ....................... 56/12.8 |
| 4,318,268 A | 3/1982 | Szymanis |
| 4,364,221 A | 12/1982 | Wixon |
| 4,453,374 A | 6/1984 | Kuhn |
| 4,543,773 A | 10/1985 | Reilly |
| 4,679,383 A | 7/1987 | Quintel |
| 4,736,573 A | 4/1988 | Seck |
| 4,916,887 A | 4/1990 | Mullet et al. |
| 4,938,011 A | 7/1990 | Pernia |
| 4,951,449 A | 8/1990 | Thorud |
| 5,069,025 A * | 12/1991 | Iversen ........................ 56/295 |
| 5,090,183 A | 2/1992 | Thorud et al. |
| 5,117,616 A | 6/1992 | McLane |
| 5,129,217 A | 7/1992 | Loehr |
| 5,133,176 A | 7/1992 | Baumann et al. |
| 5,157,908 A | 10/1992 | Sebben et al. |
| 5,205,112 A | 4/1993 | Tillotson et al. |
| 5,267,429 A | 12/1993 | Kettler et al. |
| 5,305,589 A | 4/1994 | Rodriguez et al. |
| 5,363,635 A * | 11/1994 | White et al. .................. 56/255 |
| 5,457,947 A | 10/1995 | Samejima et al. |
| 5,465,564 A | 11/1995 | Koehn et al. |
| 5,483,790 A | 1/1996 | Kuhn et al. |
| 5,488,821 A | 2/1996 | McCunn et al. |
| 5,609,011 A | 3/1997 | Kuhn et al. |
| 5,765,346 A | 6/1998 | Benter et al. |
| 5,845,475 A | 12/1998 | Busboom et al. |
| 5,884,463 A * | 3/1999 | Darzinskis .................. 56/13.4 |
| 5,894,717 A | 4/1999 | Yamashita et al. |
| 6,065,276 A | 5/2000 | Hohnl et al. |
| 6,073,430 A | 6/2000 | Mullet et al. |
| 6,101,794 A * | 8/2000 | Christopherson et al. ........ 56/6 |
| 6,189,307 B1 | 2/2001 | Buss et al. |
| 6,539,694 B1 | 4/2003 | Oxley |
| 6,557,331 B1 | 5/2003 | Busboom et al. |
| 6,602,155 B1 | 8/2003 | Buss et al. |
| 6,609,358 B1 | 8/2003 | Schmidt et al. |

FOREIGN PATENT DOCUMENTS

| | | |
|---|---|---|
| FR | 2643213 | 8/1990 |
| GB | 427120 | 4/1935 |

OTHER PUBLICATIONS

John Deere, Hydrostatic Wide-Area Commercial Walk-Behind Mowers, HD75 Aug. 15, 1997 marketing information, 4 pages.

New Holland, Ford Commercial Front Mowers brochure, undated, 15 pages.

John Deere, Purchasing Guide, undated.

US 2,788,318, 03/1957, Caldwell et al. (withdrawn)

* cited by examiner

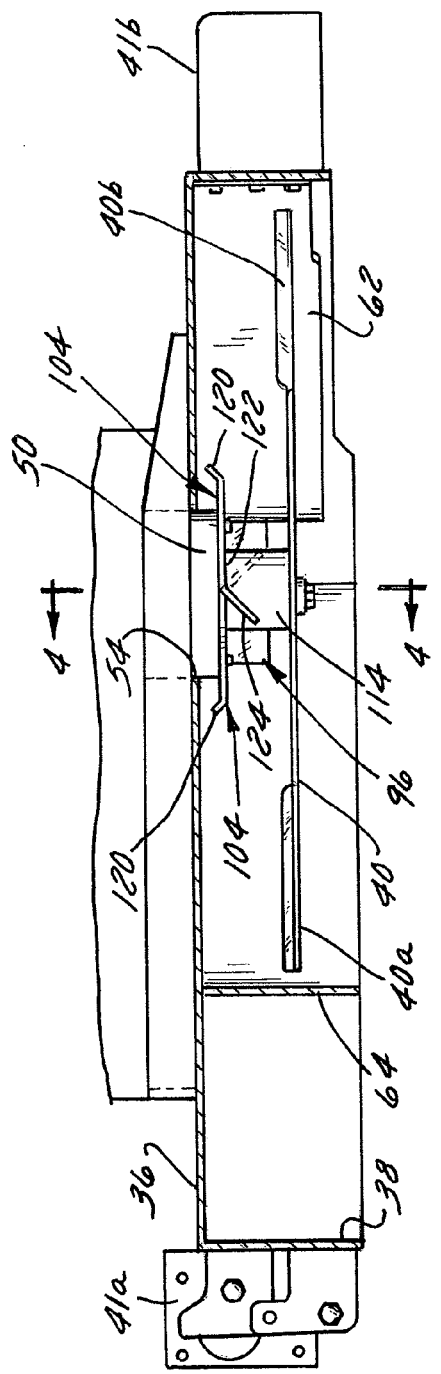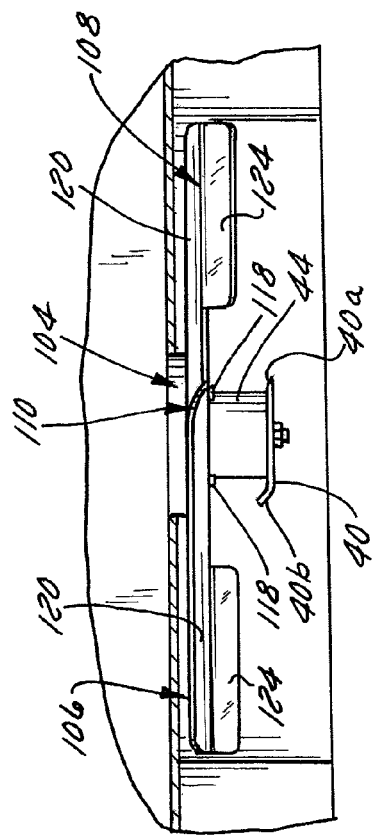

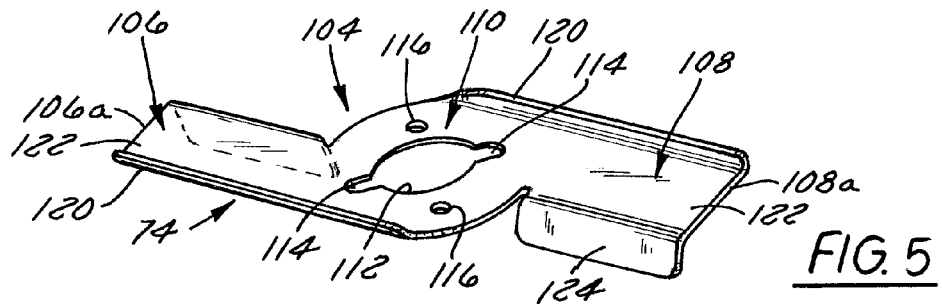
FIG. 5
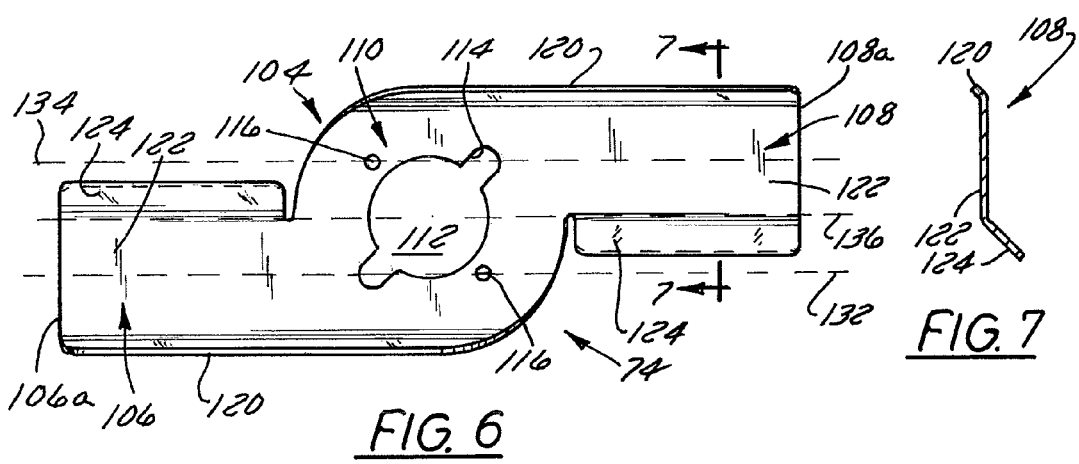
FIG. 6
FIG. 7
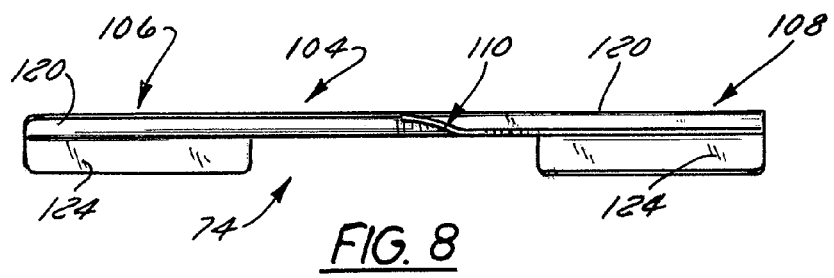
FIG. 8

LAWNMOWER HAVING MULCHING CUTTER DECK ASSEMBLY

CROSS REFERENCE TO RELATED APPLICATIONS

This application claims priority from U.S. Provisional Patent Application Ser. No. 60/519,491 filed on Nov. 13, 2003, the entire contents of each of which are hereby expressly incorporated by reference into the present application.

BACKGROUND OF THE INVENTION

1. Field of the Invention

The invention relates to lawnmowers and, more particularly, relates to a mulching type lawnmower having a mulching system configured to optimize the flow of air and clippings through the cutting chamber(s) of the lawnmower's deck.

2. Discussion of the Related Art

In an attempt to optimize their cutting performance, mulching type lawnmowers often include deflectors or other structures within the deck that are configured to deflect grass clippings downwardly from the top of the deck into the path of the cutting blades for additional cutting. These structures typically comprise triangular deflector plates located at the perimeter of the cutting chamber. The deflectors are oriented in the deck with their wide ends secured to the deck and narrow ends projecting into the cutting chamber. A number of these plates are positioned around the chamber to deflect circumferentially flowing clippings inwardly and downwardly towards the rotating blades.

However, due to the structure of the deflectors, these plates are difficult to install within the cutting chambers of the decks. Also, the positioning of the deflectors around the periphery of the cutting chamber tends to promote clogging in the chamber because the deflectors disrupt airflow in the highest pressure region of the cutting chamber. Furthermore, because of the manner in which these deflectors direct the grass clippings within the cutting chamber, the deflectors must be used in conjunction with mulcher baffles that fully or nearly fully enclose the cutting chambers.

As a result, it is desirable to develop a mulching system for a lawnmower which effectively mulches grass clippings within the cutting chamber of the mower, while also maintaining the efficiency of the mower.

SUMMARY OF THE INVENTION

The present invention is a mulching system for a lawnmower that operates to effectively mulch grass clippings formed by the mower within a cutting chamber without forming clogs or other obstructions within the mowing chamber, and without reducing the efficiency of the mower. The mulching system includes a plate secured within each cutting chamber of the mower blade. Each plate has a central section that is mounted in the center of the associated cutting chamber and a pair of outer sections that extend outwardly from the central section. The plates are formed to be generally parallel to the cutter blade, and include opposed pairs of flanges on each outer section of the plate. The flanges are angled to direct grass clippings moving within the cutting chamber downwardly through the cutting chamber into contact with the cutting blades for a more effective mulching and dispersion of the clippings. Further, the overall length of each plate is less than the diameter of the cutting chamber, such that the plate does not interfere with the airflow through the high pressure zone formed near the outer circumference of the cutting chamber, thereby preventing any build-up of grass clippings within the cutting chamber.

In mowers which have more than one cutting chamber, the mulching system of the present invention also preferably additionally includes baffles which help direct airflow and the entrained grass clippings toward the blades for mulching.

Additional features, advantages and aspects of the present invention will be made apparent from the following detailed description taken together with the drawing figures.

BRIEF DESCRIPTION OF THE DRAWINGS

A preferred exemplary embodiment of the invention are illustrated in the accompanying drawings in which like reference numerals represent like parts throughout and in which:

FIG. 3 is a cross-sectional view along line 3—3 of FIG. 2;

FIG. 4 is a cross-sectional view along line 4—4 of FIG. 3;

FIG. 5 is a perspective view of a mulching plate of the mulching system of FIG. 1;

FIG. 6 is a top plan view of the mulching plate of FIG. 5;

FIG. 7 is a cross-sectional view along line 7—7 of FIG. 6;

FIG. 8 is a front plan view of the plate of FIG. 5; and

DETAIL DESCRIPTION OF THE PREFERRED EMBODIMENTS

Figure 1:
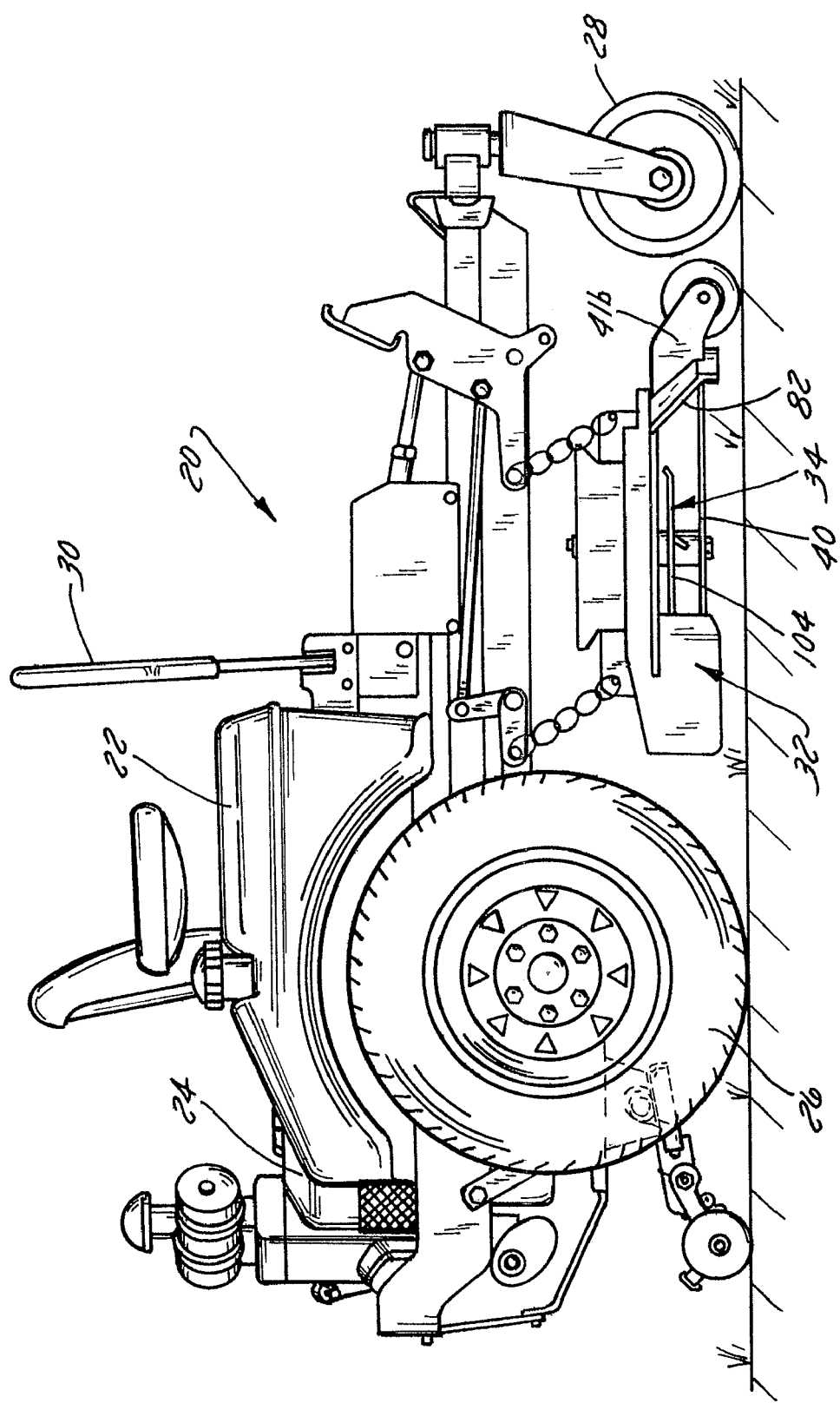
FIG. 1 is a side elevation view of a mower having a mower deck incorporating the mulch system of the present invention.

A zero turn mower with which the mulching system constructed in accordance with the present invention is utilized is illustrated generally at 20 in FIG. 1. The mower 20 includes a frame 22 that supports a motor 24 and that is supported by rear drive wheels 26 and front casters 28. The mower 20 also includes controls 30 which are utilized to control the speed of the mower 20, and the direction of the mower 20. A mower deck 32 is secured to the frame 22 of the mower 20 in a vertically adjustable manner.

Figure 2:
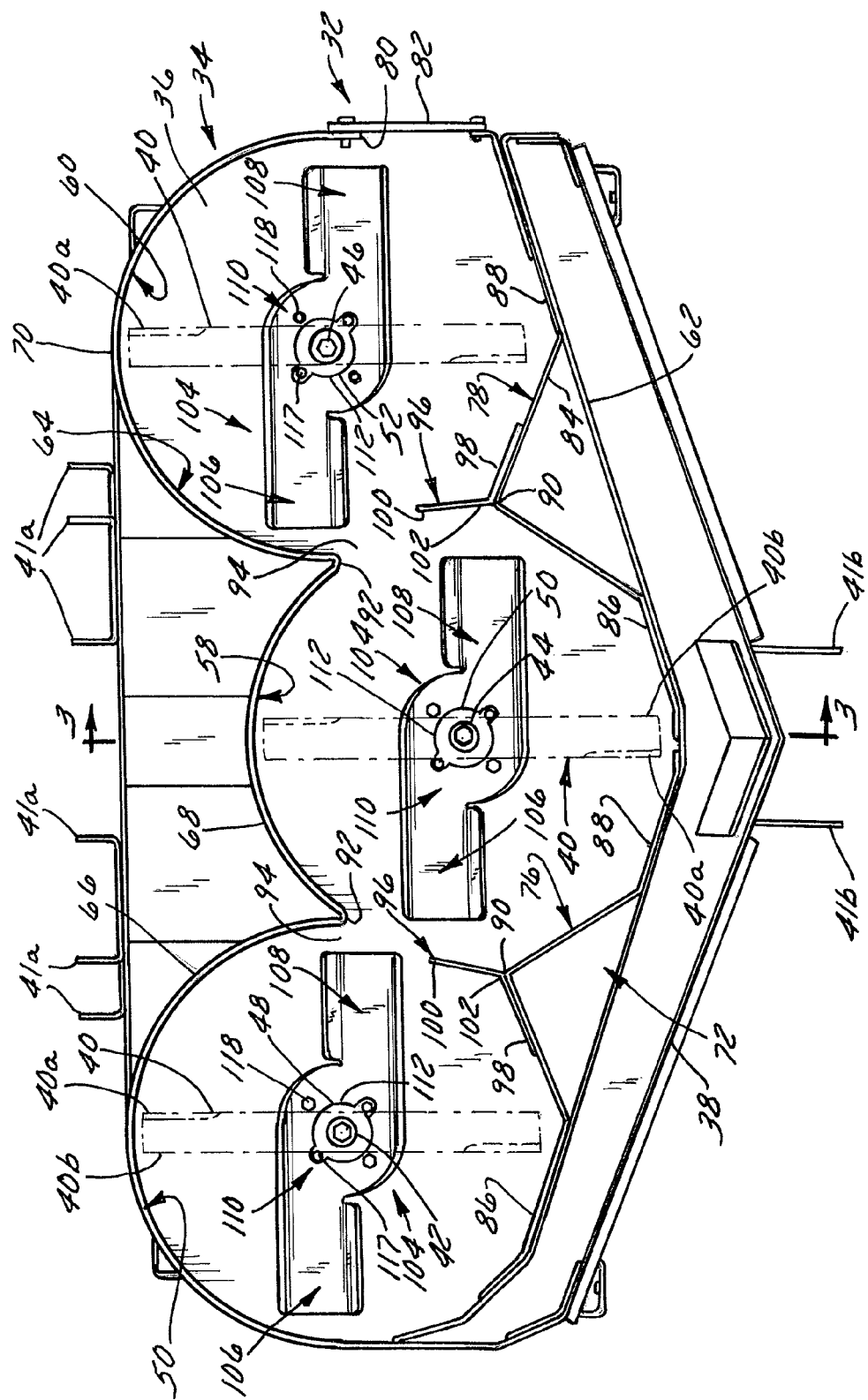
FIG. 2 is a bottom plan view of the mower deck of FIG. 1.

The cutter deck 32 employs a mulching system 34 constructed in accordance with a preferred embodiment of the invention and is illustrated best in FIGS. 2–4. While the cutter deck 32 of this embodiment is a three-blade deck, it is to be understood that some or all aspects of the invention are applicable to single and multiblade decks of varying widths and having different numbers of blades.

Referring to FIG. 2, the cutter deck 32 includes a top deck 36 and a skirt 38 which extends downwardly from the top deck 36 in surrounding relation to a plurality of conventional mower cutter blades 40. The skirt 38 generally encloses the interior of the deck 32 below the top deck 36 and includes a number of brackets 41*a* for connection to the frame 22. The front of the skirt 38 also includes a pair of brackets 41*b* that are engaged with a guide wheel 41*c*.

In a preferred embodiment shown in FIGS. 3 and 4, the blades 40 comprise mulching blades of the type typically used in a mulching mower. The outer end portion or cutting portion of each blade 40 has a sharpened leading edge portion 40*a* and upwardly turned, trailing edge 40*b*. The trailing edge 40*b* may be serrated to pulverize the cut grass and channel the cut clippings upwardly towards the top deck 36. The resultant airflow generated by the rotating blades 40 tends to take the path of least resistance, i.e., upwardly from the trailing edge 40*b* of the outer end portion of the blade 40, along the bottom surface of the top deck 36, and toward the center of the respective cutting chamber.

Still referring to FIG. 3, three blades 40 are provided in this embodiment, each of which is fixed to a respective spindle 42, 44 or 46. The spindles 42, 44, and 46 are rotatably mounted on corresponding spindle support bosses 48, 50 and 52 extending through an associated opening 54 in the top deck 36. The blades 40 are positioned within respective cutting chambers 56, 58 and 60 and bounded at their front ends by a front baffle 62 and at their rear ends by a rear baffle 64. The front baffle 62 is formed from an angled plate assembly secured to and extending downwardly from the top deck 36 rearwardly of the front end of the skirt 38. The rear baffle 64 also is secured to and extends downwardly from the top deck 36 adjacent the rear end of the skirt 38. In this embodiment, it comprises a conventional arcuate "bird-wing" baffle that is divided into three curved sections 66, 68 and 70, each of which partially encloses one of the cutting chambers 56, 58 and 60, respectively. Of course, the invention is equally applicable to systems having fewer or more cutting chambers.

Within this deck construction, the mulching system 34 of the illustrated embodiment is configured to be removably bolted onto the cutter deck 32 in either an original equipment manufacturer (OEM) or aftermarket setting. The mulching system 34 includes a baffle system 72 and a channeling system 74. The baffle system 72 comprises a pair of mulching baffle assemblies 76 and 78 disposed at the junctures of adjacent cutting chambers 56, 58 and 60 and a side discharge block off plate 80 that is bolted over a discharge opening 82 formed in the skirt 38 on one side of the deck 32.

Figure 9:
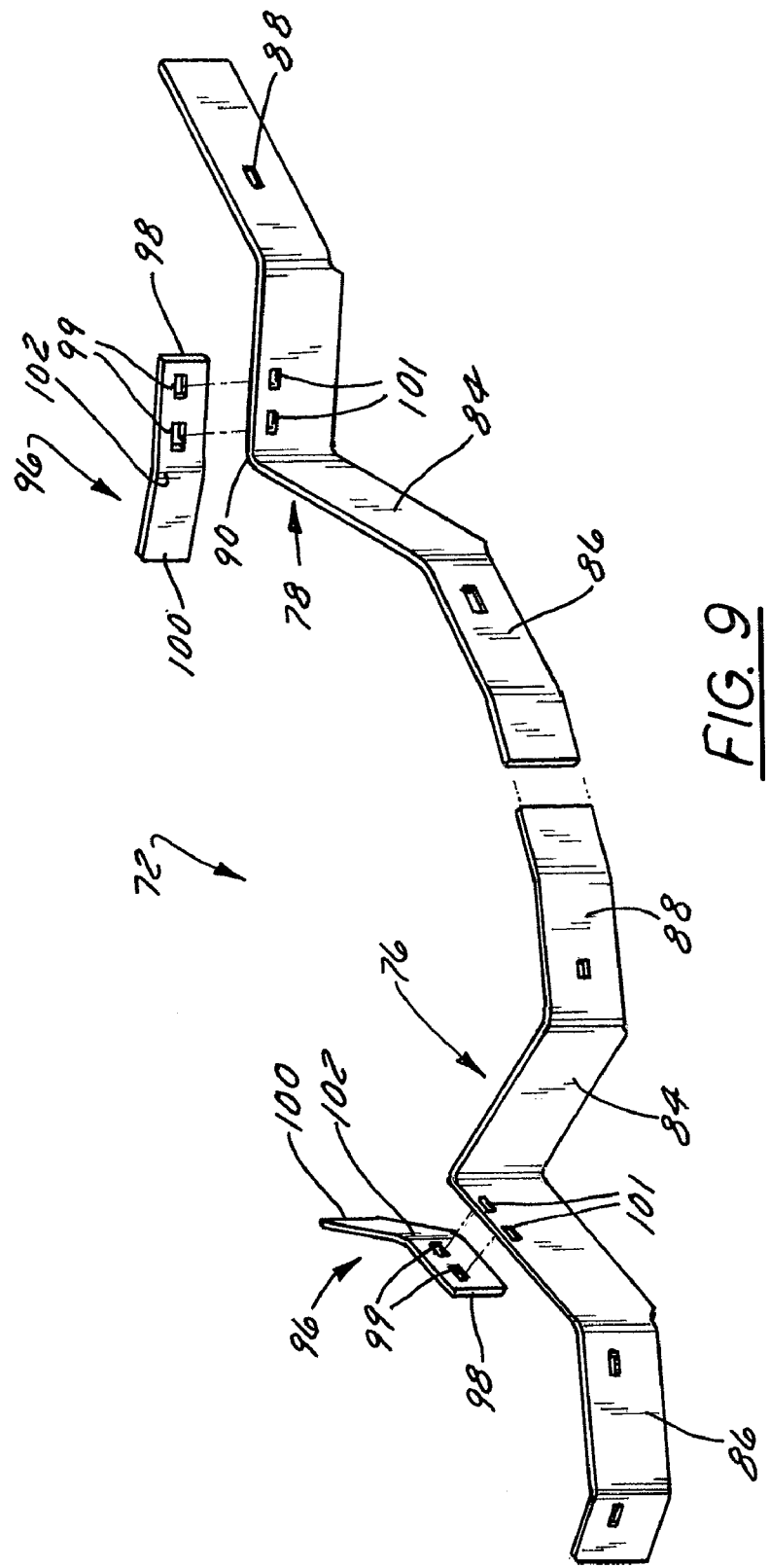
FIG. 9 is a perspective view of a baffle and directing plate assembly of the mulching system of FIG. 2.

Looking now at FIGS. 2 and 9, each mulching baffle assembly 76 and 78 includes a central V-shaped nose baffle section 84 affixed to the front baffle 62 opposite the skirt 38 by a pair of wing sections 86 and 88 extending from opposite sides of the central section 84. The baffle assemblies 76 and 78 are positioned on the front battle 62 such that the apex 90 of the central section 84 is spaced from a corresponding apex 92 of the rear baffle 64 to form a throat 94 therebetween. A mid-chamber plate 96 is secured to the central section 84 of each of the mulching baffle assemblies 76 and 78 for promoting generally circumferential flow in the cutting chambers and inhibiting the flow of clippings from one chamber to the next. The mid-chamber plates 96 are universal so as not to have a right-handedness and a left-handedness, hence facilitating assembly. Each plate 96 is angled so as to have a mounting leg 98 with openings 99 configured for attachment to slots 101 on the associated mulching baffle control section 84 and a divider leg 100 that extends away from the mounting leg 98 at a bend 102 formed in the plate 96. Each divider leg 100 extends outwardly from the bend 102 a distance of less than half the width of the corresponding throat 94. Each divider leg 100 also is positioned so that the leg 100 is not co-linear with the corresponding throat 94 but, instead, extends at an angle of about eight (8) to twelve (12) degrees relative to the throat 94.

Looking now at FIGS. 2–8, the channeling system 74 includes three channeling plates 104, one of which is located in each cutting chamber 56, 58 and 60. Each channeling plate 104 is configured to channel airflow through the associated cutting chamber 56, 58 and 60 in a manner that has been found to improve mulching of grass clippings and to aid in clipping dispersal. Each plate 104 is installed in the associated cutting chamber 56, 58 and 60 without being attached directly to the top deck 36, facilitating installation and preserving the structural integrity of the cutting deck 32. In the preferred embodiment, each of the plates 104 is attached to the mounting boss 48, 50 or 52 (FIG. 3) for the associated spindle 42, 44 or 46 (FIG. 4). Each channeling plate 104 has first and second channeling portions 106 and 108 that are positioned generally parallel to the top deck 36 on opposite sides of a central mounting portion 110. The mounting portion 110 of this embodiment includes a central opening 112 configured to fit closely around the associated spindle 42, 44 and 46. As best seen in FIGS. 5 and 6, the channeling plate can be bolted to the associated stationary spindle mounting boss 48, 50 or 52 by inserting mounting bolts 118 through a pair of apertures 116 near the central opening 112. As best seen in FIG. 2, flush mounting of the channeling plate 104 against the associated spindle mounting boss 48, 50, or 52 is accommodated by a pair of opposed notches 114 on the central opening 112 that receive existing bolts 117 on the spindle mounting boss. Mounting the channeling plates 104 in this manner considerably facilitates assembly of the channeling system 74 in either an OEM or retrofit environment and also is relatively non-invasive with regard to the top deck 36. As best seen in FIGS. 3 and 4, the mounted channeling plate 104 is spaced from the top deck 36 by a gap of, e.g., five-eights of an inch (⅝"). Alternatively, the channeling plates 104 could be mounted to a gearbox (not shown) of a gearbox driven blade, or even mounted directly to the bottom surface of the top deck 36 in a certain mower constructions.

Referring now to FIG. 6, the channeling portions 106 and 108 are located on opposite sides of a centerline 132 of the central mounting portion 112. As a result, the channeling portions 106 and 108 have longitudinal centerlines 132 and 134 that extend parallel to one another on opposite sides of the centerline 136 of the central portion 112. Each channeling portion 106 and 108 therefore extends non-radially from the center of the cutting chamber 56, 58 or 60 when the channeling plate 104 is installed in the cutting chamber. This orientation is significant because it has been found to reduce clogging in operation of the mower deck 32 when compared to structures that extend radially inwardly from the outer perimeter of the cutting chamber.

Further, each channeling portion 106 and 108 extends outwardly from the mounting portion 110 to an outer end 106*a*, 108*a* that is spaced inward of the outer periphery of the associated cutting chamber 56, 58 or 60. The length of each channeling portion 106 and 108 and the resulting gap between the portion 106 or 108 and the cutting chamber 56, 58 or 60 in which the plate 104 is disposed can vary. In the illustrated embodiment of a seventy-two (72") cutting deck having three twenty-four and one-half inch (24½") cutter blades, this gap is preferably between about one inch (1") and about two inches (2"). By leaving this gap between the outer end 106*a*, 108*a* of each channeling portion 106 and 108 and the periphery of the associated cutting chamber, the channeling plate 104 does not disrupt the airflow through the highest air pressure zone within the chamber. By not disrupting the high air pressure zone, as is done by the prior art triangular plates, the channeling plates 104 are very effective in eliminating clogging and clumping of clippings in the cutting chambers, even when the deck 32 is used to cut very wet grass.

Still looking at FIGS. 5–8, each channeling portion 106 and 108 includes a relatively shallow upturned leading flange 120, a relatively wide, flat, central portion 122, and a downturned trailing wing 124. The major surfaces of all of these structures extend generally parallel to the bottom surface of the top deck 36 rather than at an angle for the reasons discussed previously. The flange 120 in the illustrated embodiment is about eleven inches (11") long, about one-half inch (½") deep, and extends upwardly at an angle of about fifty-five degrees (55°). The flange 120 serves to stiffen the channeling plate 104 as well as to deflect air downwardly beneath the central portion 122 towards the wing 124. The wing 124 is essentially aligned and co-extensive with the leading edge portion 40a of the cutting portion of the cutter blade 40. In the illustrated preferred embodiment, the wing 124 is about six and five-eights inches (6⅝") long, about one and one-half inches (1.5") deep, and extends downwardly at an angle of about fifty degrees (50°). The wing 124 channels air and entrained clippings from the central portion 122 towards the blade 40 for mulching and dispersal. The angle of inclination, thickness, height, and axial length of the flange 120 and the wing 124 may vary depending upon the particular application. The wing 124 may also be serrated or otherwise modified to help aide in mulching.

In operation of a mower 20 including the baffle system 72 and the channeling system 74, the blades 40 in each cutting chamber 56, 58 and 60 rotate in a counter clockwise direction to cut grass. Each blade 40 also generates an airstream that is directed by the baffle system 72 along the upper surface of the top deck 36 and that is heavily laden with grass clippings. The portion of the airstream and entrained clippings in the uppermost portion of each cutting chamber encounter the downwardly turned flange 120 on the plate 104 and are deflected downwardly. The airstream and clippings then pass under the central portion 122 and encounter the wing 124, where they are again deflected downwardly by the wing 124 into the cutting path of the rotating blade 40. Hence, the deflection performed by the plate 104 is two-stage, relying largely on an air pressure differential generated by the geometry of the wing 124. Importantly, however, the channeling plate 104 does not contact or interfere with high-velocity, high-pressure airflow around the perimeter of the cutting chamber. Grass clippings instead exit the top deck 36 through the more central, lower pressure zone around the central or non-cutting region of the blade 40. This reduces grass buildup in the outer circumference of each cutting chamber 56, 58 and 60, leaving the baffle system 72 and the cutting chambers 56, 58 and 60 free and clear of obstructions formed by clipping build-up. This results in less drag on the motor 24, a cleaner, freer flowing deck 32, and increased quality of cut. In addition, and unlike previously available radially extending deflecting structures, the mulching system 34 of the present invention has been found to effectively disperse clippings from the deck 32 even if the mulcher baffle assemblies 76 and 78 and the side discharge block off plate 80 are removed.

In order to enable the plates 104 to be used effectively within the cutting chambers 56, 58 and 60 of the deck 32, the plates 104 are formed of a generally rigid material. The particular material selected for the plates 104 is capable of withstanding repeated contact with objects on the ground over which the deck 32 passes, such as stones, without substantially affecting the effectiveness of the plates 104. Thus, suitable materials for forming the plates include metals and hard plastics that can each also include interior or exterior reinforcing members to enhance the durability of the plates 104. Also, the same types of materials and constructions can be used in forming the baffle assemblies 76 and 78.

Various alternatives are contemplated as being within the scope of the following claims particularly pointing out and distinctly claiming the subject matter regarded as the invention.

We claim:

1. A channeling device for a mower cutting deck having at least one cutting chamber with a cutting blade mounted therein, the channeling device comprising:
    a) a mounting section configured to be secured to the cutting deck within the cutting chamber such that the channeling device is fixed from rotation relative to the cutting deck; and
    b) a channeling section extending outwardly from the mounting section in a non-radial direction relative to a rotational axis of the cutting blade and the mounting section, the channeling section having an outer end that is dimensioned to be spaced from a periphery of the cutting chamber.

2. The channeling device of claim 1, wherein the mounting section is releasably securable to the deck in a suspended position within the cutting chamber.

3. The channeling device of claim 2, wherein the mounting section is releasably securable to the deck at least approximately in the center of the cutting chamber.

4. The channeling device of claim 3, wherein the mounting section is releasably securable within the cutting chamber directly above the cutting blade.

5. The channeling device of claim 1, wherein the channeling section comprises:
    a) a laterally central portion connected to the mounting section; and
    b) a first flange extending downwardly from the central portion.

6. The channeling device of claim 5, wherein the first flange is dimensioned to be at least generally coextensive with a cutting portion of the cutting blade.

7. The channeling device of claim 5, wherein the first flange is inclined at an angle with respect to the vertical.

8. The channeling device of claim 5, further comprising a second, upwardly extending flange disposed on an edge portion of the central section generally opposite the first flange.

9. The channeling device of claim 8, wherein the second flange is longitudinally longer and vertically shallower than the first flange.

10. The channeling device of claim 1, wherein the channeling section is a first channeling section, and further comprising a second channeling section extending non-radially outwardly from the mounting section generally opposite the first channeling section and having an outer end that is dimensioned to be spaced from the periphery of the cutting chamber.

11. The channeling device of claim 10, wherein the first channeling section and the second channeling section are located on opposite sides of a centerline of the mounting section.

12. The channeling device of claim 1, wherein the channeling device is a unitary metal plate.

13. A channeling plate for a mower cutting deck having at least one cutting chamber, a stationary spindle boss extending downwardly into the cutting chamber and supporting a rotary spindle, and a cutting blade mounted on the spindle, the channeling plate comprising:

a) a mounting section having an opening formed therein that is dimensioned to fit over the spindle and having additional openings for receiving fasteners for fastening the channeling plate to the spindle boss such that the channeling device is fixed from rotation relative to the cutting deck; and b) first and second opposed channeling sections that extend non-radially outwardly from the mounting section and that have longitudinal centerlines that are located on opposite sides of a centerline of the mounting section, each of the first and second channeling sections having
  i) an outer end dimensioned to be spaced from the periphery of the cutting chamber,
  ii) a laterally central portion, and
  iii) a flange extending downwardly from the central portion, the flange being dimensioned to be at least generally coextensive with the cutting blade.

14. The channeling plate of claim 13, wherein the flange of each channeling section is a first flange, and wherein each channeling section further comprises a second, upwardly extending flange disposed on an edge portion of the central section generally opposite the first flange.

15. A mower deck comprising:
a) the deck having a top panel;
b) at least one baffle extending downwardly from the top panel to form at least one cutting chamber;
c) a cutting blade rotatably mounted within the at least one cutting chamber; and
d) a channeling device secured within the at least one cutting chamber above the cutting blade such that the channeling device is fixed from rotation relative to the mower deck, the channeling device having
  i) a mounting section secured to the cutting deck within the cutting chamber; and
  ii) a channeling section extending non-radially outwardly from the mounting section, the channeling section having an outer end spaced from a periphery of the cutting chamber.

16. The mower deck of claim 15, wherein the channeling section is a first channeling section, and wherein the channeling device includes a second channeling section extending non-radially outwardly from the mounting section generally opposite the first channeling section.

17. The mower deck of claim 16, wherein the first channeling section and the second channeling section of the channeling device are located on opposite sides of a centerline of the mounting section.

18. The mower deck of claim 16, wherein each of the first and second channeling sections of the channeling device has a trailing edge in the direction of blade rotation that includes a downwardly turned flange.

19. The mower deck of claim 18, wherein the flange of each channeling section is at least generally coextensive with a cutting portion of the cutting blade.

20. The mower deck of claim 16, wherein each of the first and second channeling sections of the channeling device has a leading edge in the direction of the blade rotation that includes an upwardly turned flange.

21. The mower deck of claim 16, wherein the first channeling section and the second channeling section of the channeling device are oriented generally parallel to the top panel and the cutting blade.

22. The mower deck of claim 16, wherein the channeling device is a unitary metal plate.

23. The mower deck of claim 16, wherein the deck includes a first cutting chamber and a second cutting chamber, and wherein the at least one baffle includes a front baffle and a rear baffle, the front baffle including a V-shaped member and a mid-chamber plate secured to the V-shape member to form a throat between the front baffle and the rear baffle between the first and second cutting chambers.

24. A lawnmower having at least one mower deck as recited in claim 16.

* * * * *